United States Patent [19]

Pecone

[11] Patent Number: 5,513,329
[45] Date of Patent: Apr. 30, 1996

[54] MODULAR HOST LOCAL EXPANSION UPGRADE

[75] Inventor: Victor Pecone, Austin, Tex.

[73] Assignee: Dell USA, L.P., Austin, Tex.

[21] Appl. No.: 92,179

[22] Filed: Jul. 15, 1993

[51] Int. Cl.⁶ .................................................. G06F 13/00
[52] U.S. Cl. ............................................ 395/281; 395/282
[58] Field of Search ................................... 395/325, 500

[56] References Cited

U.S. PATENT DOCUMENTS

| | | | |
|---|---|---|---|
| 4,979,075 | 12/1990 | Murphy | 361/399 |
| 5,036,481 | 7/1991 | Lunsford | 364/708 |
| 5,191,657 | 3/1993 | Ludwig | 395/325 |
| 5,218,514 | 6/1993 | Huynh | 361/384 |
| 5,321,827 | 6/1994 | Lu | 395/500 |
| 5,338,214 | 8/1994 | Steffes | 439/160 |

*Primary Examiner*—Jack B. Harvey
*Assistant Examiner*—John Travis
*Attorney, Agent, or Firm*—Paul Katz; James Huffman

[57] ABSTRACT

A personal computer system utilizes a simplified motherboard having connectors on the motherboard that are electrically connected to data, address, control, power and ground signals necessary for expansion and upgrade of the computer system and a riser card or cards having the desired interface connectors and logic circuits thereon. The present invention provides for operatively and removably coupling a plurality of I/O expansion cards, host local bus interfaces and future system upgrades for the computer system without burdening the base cost thereof. The computer system may be expanded or upgraded at any time during manufacture or in the field. A simple and low cost common motherboard is utilized in the manufacture of the computer systems, resulting in lower manufacturing costs. A base computer system may be easily upgraded when more features are desired. A riser card is configured for the desired features, plugged into the motherboard connectors, and the desired new peripheral features plugged into the riser card to complete the upgrade.

1 Claim, 10 Drawing Sheets

MODULAR HOST LOCAL EXPANSION UPGRADE

BACKGROUND OF THE INVENTION

1. Technical Field

This invention relates generally to computers, and in particular, to modular expansion upgrades thereof.

2. Background of the Invention

Personal computers are becoming more prevalent in the work place with more and more people depending on their livelihoods from the use thereof. Advances in computer technology have created the ability and thus the demand for increased memory capacity, faster program computation, higher display resolution and faster presentation of information to the computer user. The demand for personal computers may also be attributable to its ease of use and adaptability to a multitude of tasks, both now and in the future.

The flexibility, adaptability and upgradability of the personal computer is in large part a function of the ease in which new developments in technology and functionality may be incorporated therein, both during manufacture at the factory and after purchase at the computer user's office or home. The personal computer market place has enjoyed an abundance of new and improved technologies largely because of an open system architecture and widely publicized interface standards.

The first of the personal computer interface standards was the Industry Standard Architecture (ISA) bus. The ISA bus utilizes an 8 bit input-output (I/O) bus having a maximum of 8 MHz data throughput. As the speed and sophistication of the personal computer system central processing unit (CPU) increased, a faster and higher data throughput capacity bus became necessary. The Extended Industry Standard Architecture (EISA) bus was developed to enable greater data throughput. The EISA bus utilizes a 32 bit I/O bus having a maximum of 8 MHz data throughput per 32 bit transfer.

The EISA bus, however, is still not sufficiently fast for computer operations requiring large amounts of digital data to be quickly transferred such as, for example, during hard disk access, communications, and video display. The transfer rate of the data over either the ISA or EISA buses is a limiting factor in the operation of the computer system. As an example, the speed at which a video display may be updated is determined by the transfer rate of the video data. Therefore, when a high resolution color display utilizing many colors needs to be updated, the amount of video data required takes an unacceptably long time to transfer over the ISA or EISA buses.

To alleviate this data transfer bottleneck, computer system manufacturers began utilizing a special data, address and control bus system that is closely coupled to the central processing unit (CPU) and random access memory (RAM). This bus operates at the same speed as the CPU, for example, 25–40 MHz. This high speed bus system is sometimes referred to as the "host local bus". By utilizing the host local bus, disk and high-speed video data transfers between memory or the CPU need no longer pass through either the ISA or EISA bus interfaces with their limited bandwidth. A standard for video controller interfaces utilizing the computer system local bus is being proposed by the Video Electronic Standards Association as a standard for advanced local bus video controllers (this standard referred to hereinafter as "VESA/VL").

Thus, a personal computer system may utilize either an ISA or EISA bus standard and a host local bus standard such as the VESA/VL bus standard. Utilizing a combination of these bus standards is desirable and appropriate for particular types of peripherals, so that each of these bus standards has utility for a particular purpose.

A personal computer system, in one conventional construction, is illustrated in FIG. 1. A computer housing 100 contains a power supply 102, floppy disk drive 104, hard disk drive 106, and motherboard 108. Referring to FIG. 2, the motherboard 108 has input-output connectors 202 adapted to receive either ISA or EISA peripheral device cards. Commonly owned U.S. Pat. No. 5,036,481, issued Jul. 30, 1991 and incorporated by reference herein, more fully illustrates the construction of a conventional personal computer system.

The computer motherboard 108 or system planar mounts horizontally in the system 100 housing. The motherboard 108 contains the CPU and support circuits thereto and provisions for connection of random access memory (RAM). More recent motherboards may incorporate provisions for a VESA/VL bus interface device such as interface logic circuits and VESA/VL connectors.

The motherboard 108 has a plurality of connectors 202 thereon for either ISA or EISA bus devices, and may be adapted to interface with a VESA/VL device (not illustrated). Support circuits are also needed to accommodate the various bus standards, and serial and parallel ports for the particular computer system. These support circuits are frequently referred to as "glue logic" and typically are located on the motherboard 108. Making provisions for future additions and upgrades in the computer system raises the complexity and cost of the computer system motherboard 108 and may doom the motherboard to early obsolescence if newer interface standards become popular. It is, therefore, an object of the present invention to provide an improved system and apparatus that allows easy upgradability without burdening the cost of a base computer system.

SUMMARY OF THE INVENTION

From a broad perspective, the present invention provides for operatively and removably coupling a plurality of I/O expansion cards, host local bus interfaces and future system upgrades in a computer system without burdening the base cost thereof. The invention consists of a set of connectors on the computer system motherboard that are electrically connected to all data, address, control, power and ground signals necessary for expansion and upgrade of the computer system and a riser card or cards having the desired interface connectors and logic circuits thereon.

The present invention allows the computer system to be expanded and upgraded at any time during manufacture or in the field. A simple and low cost motherboard may be utilized in the manufacture of computer systems that can be sold at lower cost to a consumer because the motherboard is now common to all of the computer systems manufactured. The consumer need purchase only the minimum computer system needed and, when ready for more features, a riser card adapted for the desired feature upgrade may be plugged into the motherboard connectors.

In a preferred embodiment of the present invention, a host local bus expansion riser card may be inserted into the motherboard connectors. The riser card includes the necessary glue logic for properly interfacing to peripheral interface cards such as, for example, a VESA/VL video interface.

The peripheral interface cards plug into the riser card. The VESA/VL card requires signals to and from the ISA I/O and host local buses. This is easily accomplished by the present invention by having all necessary computer system signals available at connectors placed in-line with the standard ISA or EISA connector slots.

In one aspect of the present invention, the I/O and host local bus connectors are in-line on the computer system motherboard allowing a substantially unlimited number of options to be added now and in the future to a low cost base computer system. Features such as secondary cache cards, upgraded processors, or other host interface adapters for higher modularity feature upgrades are possible. By appropriate design of the riser board, any number or combination of different interface devices may co-exist within the computer system. Features unheard of when the computer system was purchased may be easily implemented at a later date without obsoleting the majority of the components of the computer.

In another aspect of the invention, a riser card has application specific integrated circuit (ASIC) glue logic that creates the control signals required by a VESA/VL interface card. This riser card has provisions for and is adapted to connect to a plurality of either ISA or EISA interface cards along with the VESA/VL interface card. The riser card may be configured with a card cage housing module that contains and holds all of the interface cards so that this expansion card/riser card module may be easily removed from the system motherboard.

In yet another aspect of the invention, a secondary cache memory and controller may be part of the riser expansion card. Placing application specific circuitry in the riser card minimizes the amount of space required on the motherboard, but allows functional support as needed. The motherboard need not be manufactured with extra support logic for anticipated future additions, so long as the motherboard makes available, by means of appropriately placed connectors thereon, a complete set of data, address and control signals of the CPU and RAM. In addition, the motherboard connectors may be placed wherein the connectors are close coupled to the CPU for efficient and reliable transfer of high speed signals therebetween.

A feature of the present invention is having the motherboard connectors in-line and spaced so that any combination of ISA or EISA bus, host local bus or future bus expansions may be selectively accomplished by inserting an appropriate riser card or cards therein. By partitioning the active logic on the riser card specific to the expansion interface requirements, the computer system manufacturer need not produce computer system motherboards that anticipate future user requirements, standards or technologies. The riser card is relatively trivial in cost compared to the overall cost of the computer system. Thus, as new standards emerge or technologies improve, a new riser card can embrace these new technologies or changing user requirements.

In another aspect of the invention, the motherboard in-line connectors may be utilized for connection of a riser or daughterboard having a newer processor or multiple coprocessors to further enhance or update the computer system. This allows the computer manufacturer to inventory standard motherboards that may be configured later during final assembly for the latest processor technology. Thus, manufacturing of a substantial part of the computer system need not be delayed while new products are developed.

Other and further objects, features and advantages will be apparent from the following description of the preferred embodiment of the invention, given for the purpose of disclosure and taken in conjunction with the accompanying drawings.

DETAILED DESCRIPTION OF A PREFERRED EMBODIMENT

Figure 1:
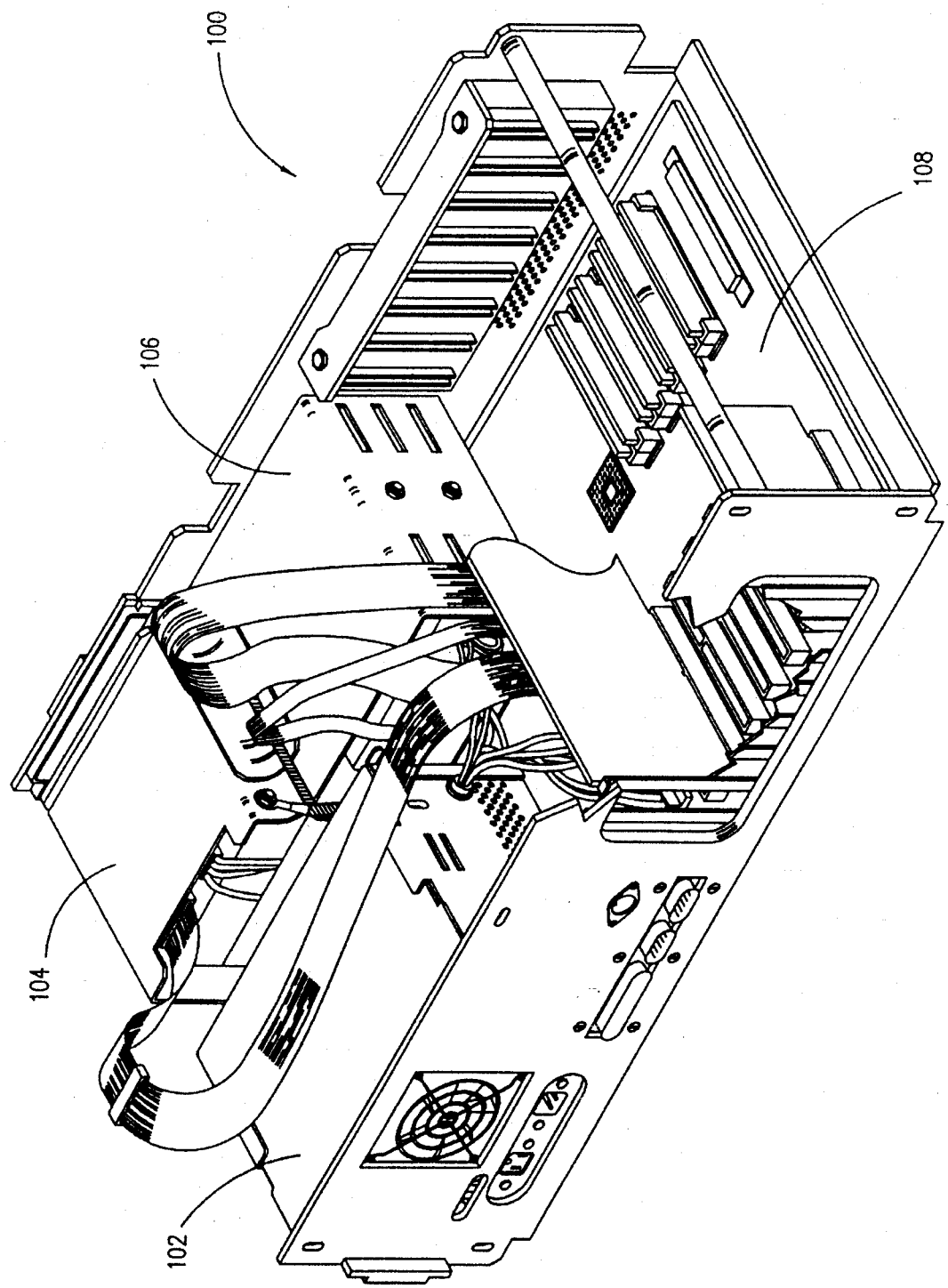
FIG. 1 is an isometric partial view of a prior art computer system.
Figure 2:
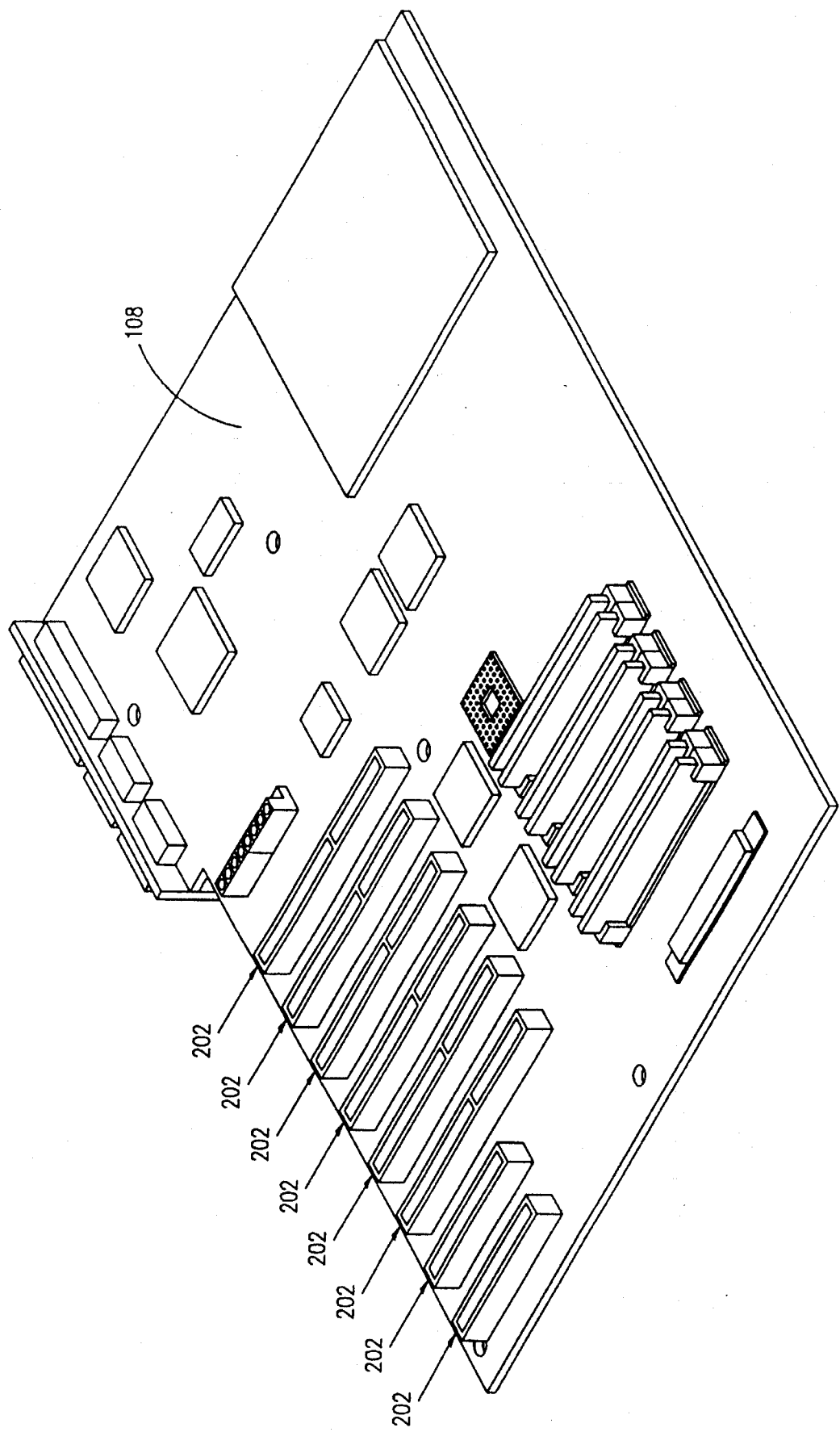
FIG. 2 is an isometric view of a prior art motherboard of FIG. 1.

Referring now to the drawings, the details of preferred embodiments of the present invention are illustrated. Like elements have the same number. In the drawings, the number 1100 (FIG. 9) designates generally a computer system utilizing the present invention.

Figure 3:
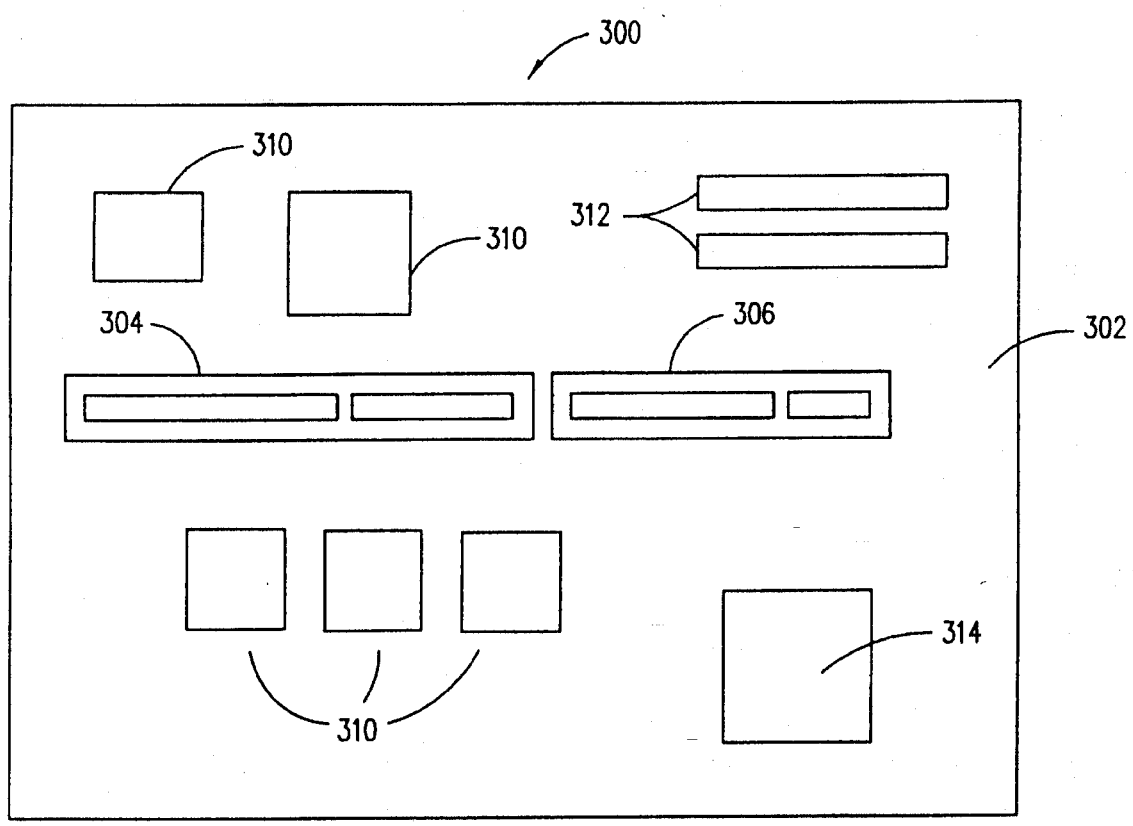
FIG. 3 is a top plan view of a motherboard in accordance with a preferred embodiment of the present invention.
Figure 9:
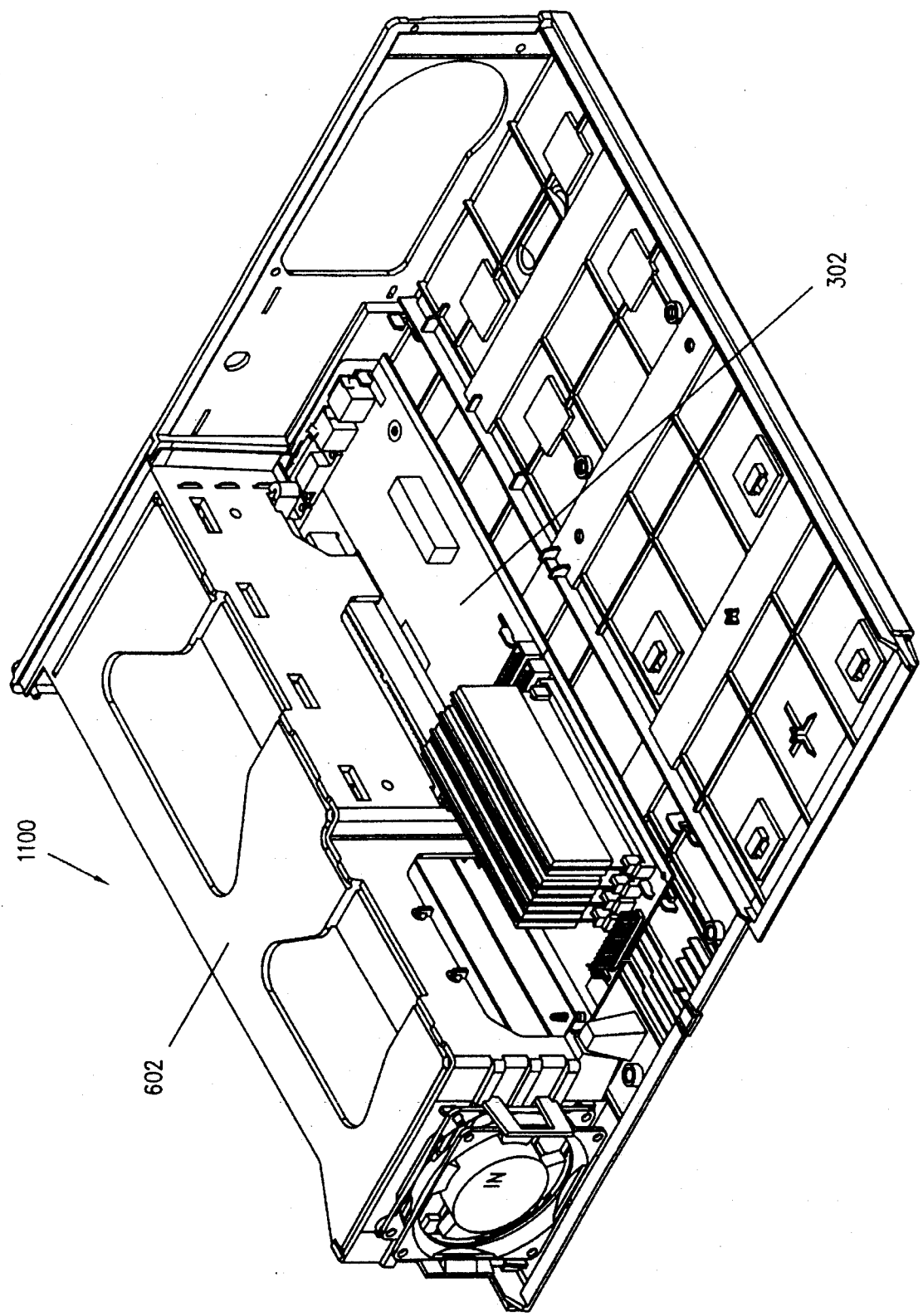
FIG. 9 is a partial isometric view of a computer system in accordance with the present invention.

Referring now to FIG. 3, a motherboard is illustrated in top plan view as utilized in the computer system 1100 (FIG. 9). The motherboard 300 consists of a planar printed wiring board 302, input-output connectors 304, and host local bus connectors 306. The motherboard 300 also contains logic circuits 310, random access memory 312 and microprocessor 314. The connectors 304 and 306 are aligned such that a portion of a riser card or cards may be removably insertable therein.

Figure 4:
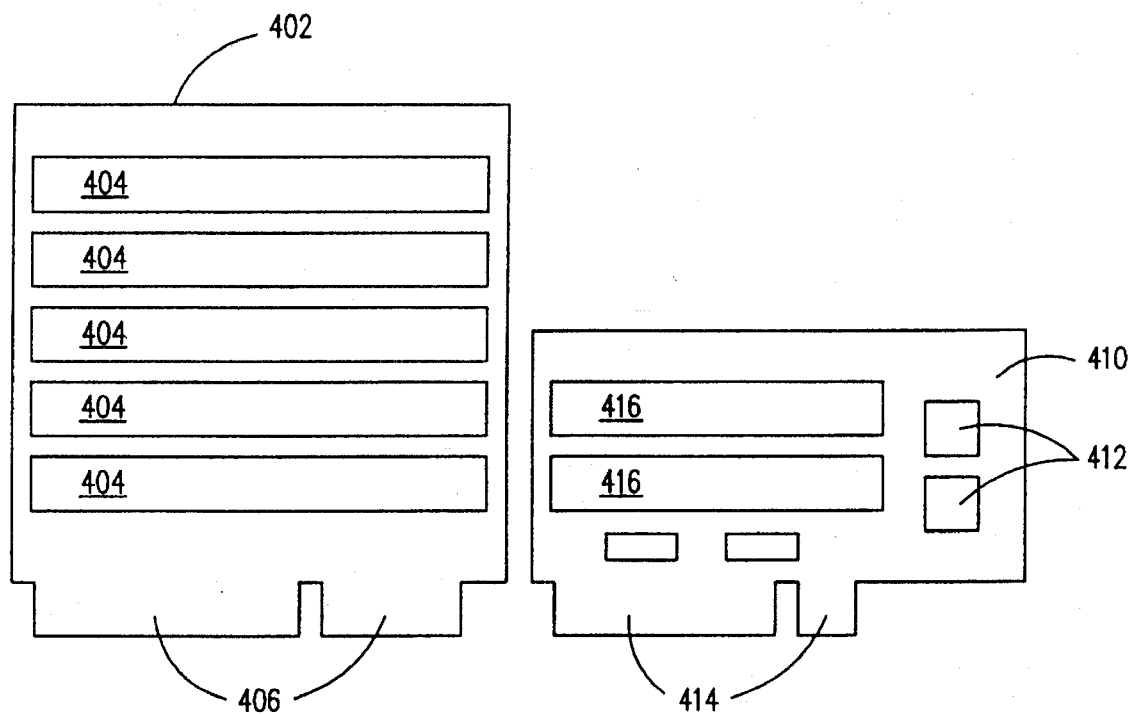
FIG. 4 is an elevational view of riser cards in accordance with a preferred embodiment of the present invention.

Referring now to FIG. 4, an elevational view of a riser card of a preferred embodiment of the present invention is illustrated. Riser card 402 has input-output connectors 404 attached thereto. The riser card 402 has edge connections 406 that are removably insertable into the motherboard connector 304. There is a one-for-one signal connection correspondence between the edge connections 406 and the connectors 404. The connectors 404 are adapted to receive input-output peripheral interface cards such as, for example, ISA or EISA devices. The ISA or EISA interface cards are removably insertable into the connectors 404.

Figure 10:
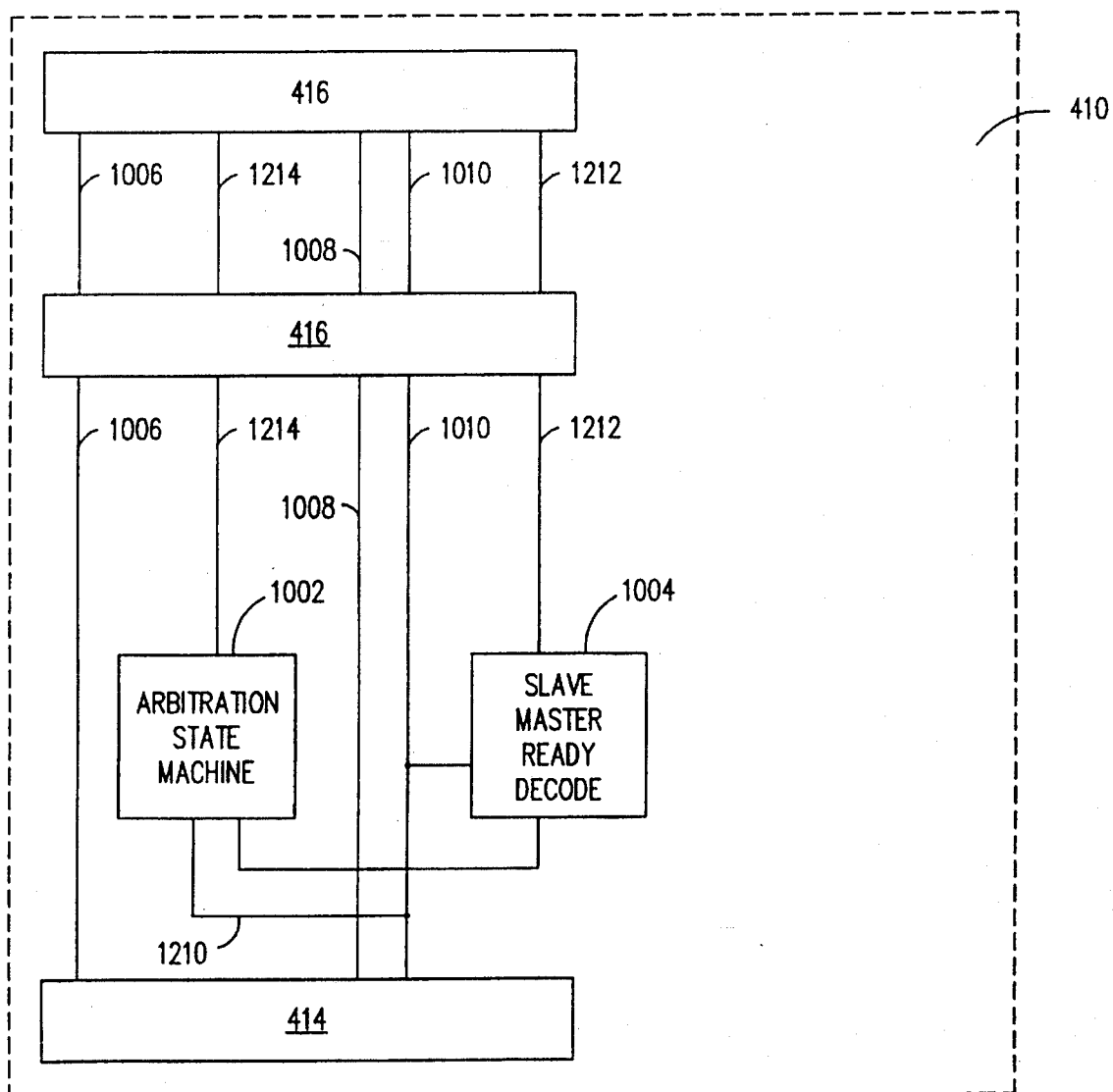
FIG. 10 is a schematic block diagram of a preferred embodiment of a riser card in accordance with the present invention.

Riser card 410 may be utilized for connection of peripheral interface devices such as a VESA/VL interface to a host local bus closely coupled to the computer system central processing unit (CPU) or microprocessor. The card 410 has logic circuits thereon that are utilized for signal translation and control between the computer system local bus and a VESA/VL standard peripheral interface. The logic circuits generally are referenced by the number 412 and may be, for example, logic circuits for an arbitration state machine (FIG. 10) and a slave master ready decode (FIG. 10).

The riser card 410 has connections 414 that are removably insertable into the motherboard connector 306. Data, address and control signals of the host local bus are directly connected to the connector 306 and the data, address, and some of the control signals are directly connected to VESA/VL connectors 416. The other control signals are processed in the logic circuits 412. A VESA/VL interface card may be removably inserted into connectors 416 and 404 which are in alignment. In addition, it should be understood that the connector 306, and the connectors 416 may be supersets of the VESA/VL interface.

Figure 5:
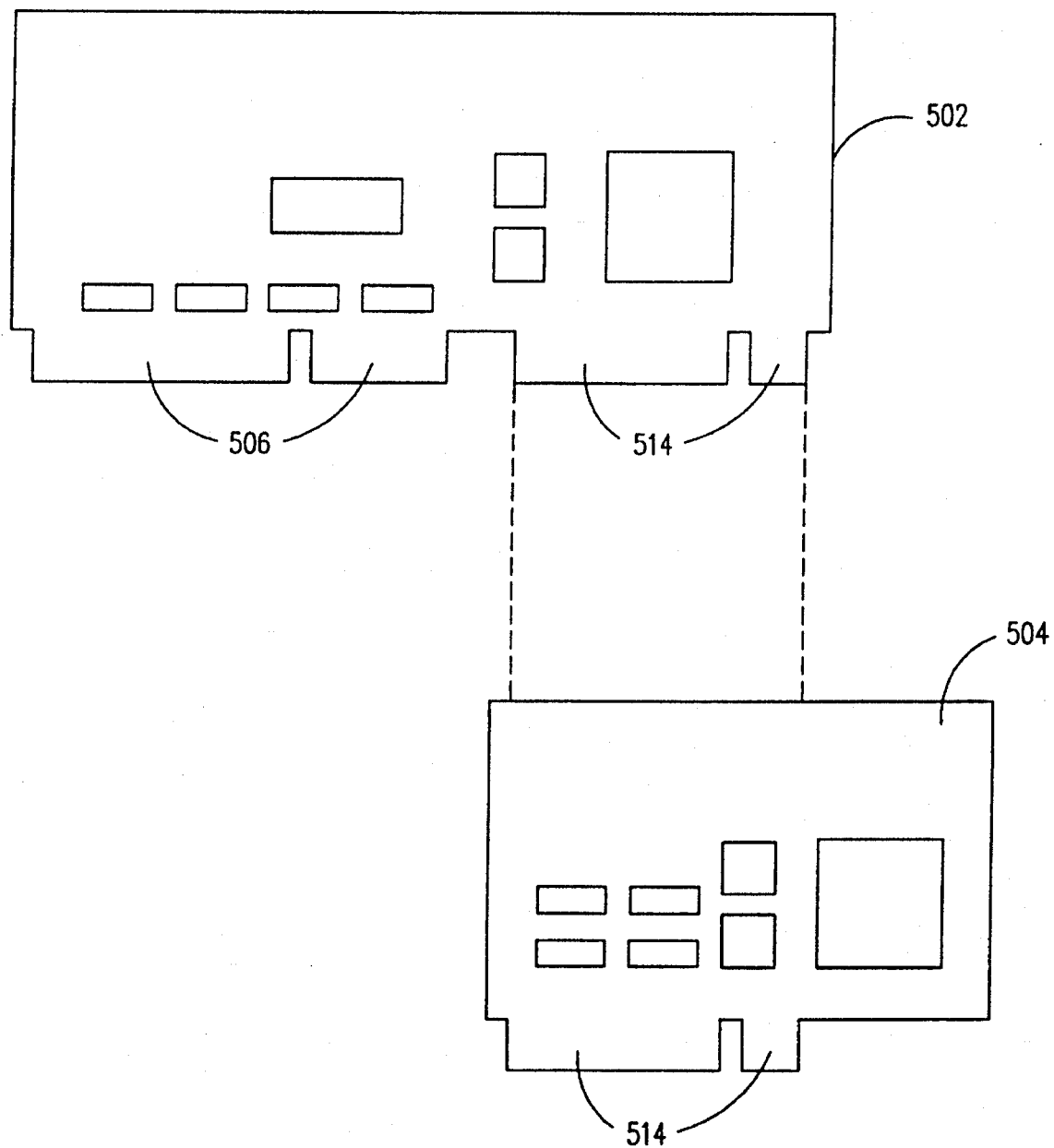
FIG. 5 is an elevational view of an enhancement card in accordance with a preferred embodiment of the present invention.

Referring now to FIG. 5, logic cards consisting of circuit logic, memory and a microprocessor are illustrated in plan view. The card 502 may be a VESA/VL interface card having connections 506 and 514 that are removably insertable into the connectors 304 and 306, respectively. The card 502 is directly insertable into the motherboard connectors without an intermediate riser connector card therebetween. The signal card 502 may be inserted into the connectors 304 and 306 which are aligned in a row on the motherboard.

A logic card 504 having connections 514 is removably insertable into the connector 306. The logic card 504 may consist of a cache memory and controller or a newer technology microprocessor that can replace the existing microprocessor in the computer system or co-process therewith. The logic cards 502 and 504 allow for easy implementation of additional features or upgradability to the computer system.

The motherboard 302 need not contain extra logic circuitry for support of desired peripheral expansion or addition of useful features to the computer system. This makes the initial manufacturing costs of the computer system less because the motherboard thereof is smaller, has less circuitry and does not become obsolete as quickly as one having possible anticipated features that are never used or change with newer technological implementations.

Figure 6:
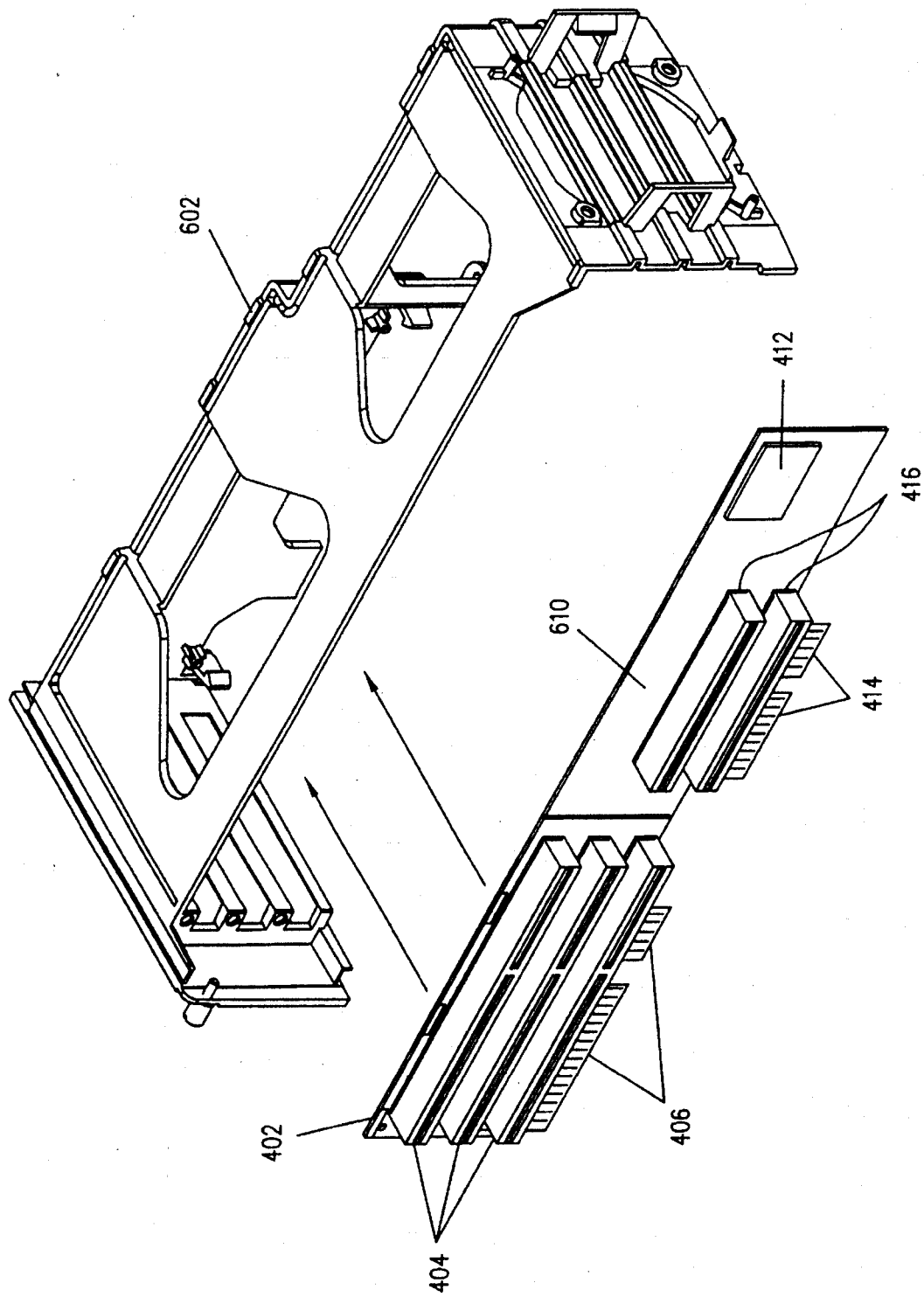
FIG. 6 is an exploded isometric view of a riser card and peripheral card cage in accordance with a preferred embodiment of the present invention.

Referring to FIG. 6, an exploded isometric view of the riser cards 402 and 410, and a card cage 602 is illustrated. The card cage 602 attaches to the riser cards 402 and 410 and is adapted to hold peripheral interface cards, VESA/VL cards and other additions or enhancements to the computer system. Commonly owned co-pending U.S. patent application Ser. No. 07/967,903, entitled "Expansion Card/Riser Card Module for Desktop Computers", filed Oct. 27, 1992, more fully illustrates a preferred embodiment and application of this card cage apparatus, and is incorporated herein by reference for all purposes.

Figure 7:
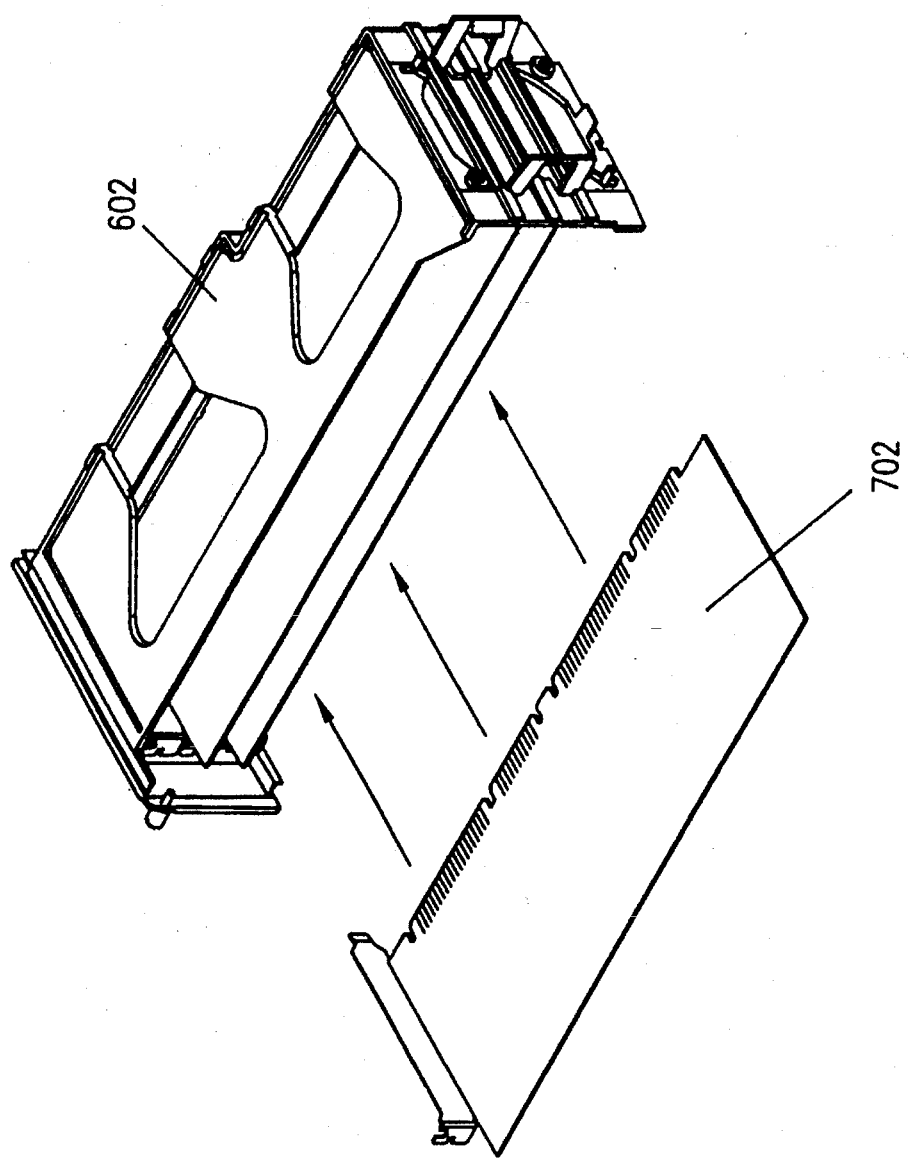
FIG. 7 is the apparatus of FIG. 6 illustrating peripheral card being inserted therein.

Referring now to FIG. 7, an exploded isometric view of a peripheral interface card and the card cage 602 is illustrated. The card cage 602 is adapted to hold interface cards 702 such as, for example, ISA or EISA cards, VESA/VL cards or other interface, expansion or upgrades as desired. The cards 702 are slidably inserted into the cage 602 and connect into the riser board connectors 404 and 416 (FIG. 6).

Figure 8:
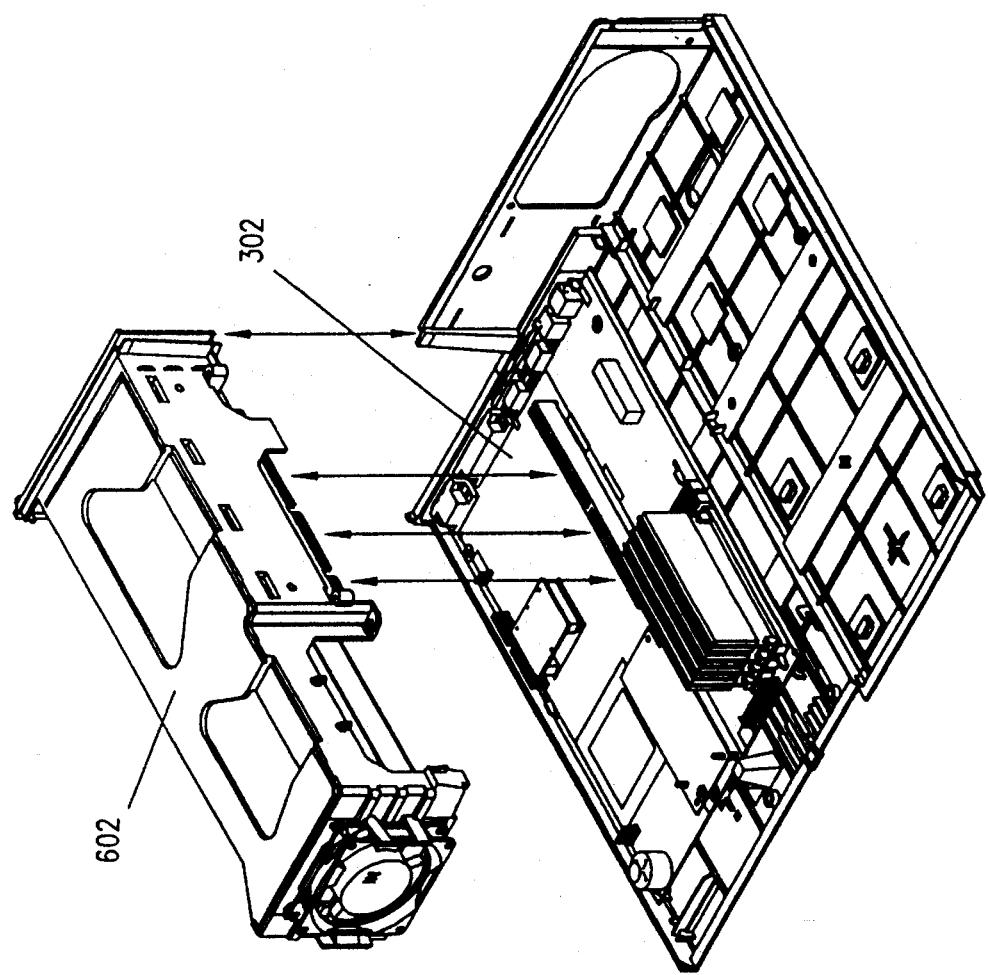
FIG. 8 is the apparatus of FIGS. 8 and 9 illustrated in exploded isometric view in relation to a motherboard and computer housing in accordance with the present invention.

Referring now to FIG. 8, an exploded isometric view of a preferred embodiment of the present invention is illustrated. Once all of the cards 702 are inserted into the cage 602, the cage 602 containing the cards 702, may be attached to the computer system motherboard. The riser cards 402 and 410 are substantially perpendicular to the plane of the motherboard 302 when inserted into the connectors 304 and 306. When the cage 602 is attached to the motherboard 302, all connections are made to the desired peripheral cards 702 contained therein. FIG. 9 illustrates the card cage 602 attached to and in place in the computer system 1100.

Referring now to FIG. 10, a schematic block diagram of a riser card in accordance with a preferred embodiment of the present invention is illustrated. The riser card 410 consists of connectors 416, edge connections 414, and logic circuits 1002 and 1004. Signals consisting of data 1006, address 1008, and control 1010 are directly connected from the connections 414 to the connectors 416.

Some control signals 1212 and 1214 are first processed in the logic circuits 1002 and 1004 before being connected to the connectors 416. Logic circuits 1002 and 1004 may be, for example, an arbitration state machine and a slave-master ready decode, respectively. These active logic circuits enable the computer system 1100 host local bus to properly interface to an industry standard such as the VESA/VL standard without needing special interface or glue logic on the motherboard. This is a savings to the computer manufacturer which enables more efficient manufacturing and cost competitive products. In addition, if an interface standard is changed, then all that is required is the replacement of the riser card 410 without obsoleting the more expensive motherboard.

The present invention allows access to all data, address and control buses of the computer system. Any form of in-line connector schemes on a system motherboard may be utilized. These connectors may support perpendicular expansion riser cards, feature upgrade cards including cache memory and newer processor complex or other host interace adapters for higher modularity feature upgrades. The present invention is not limited to the size or number of in-line connectors that compose an expansion slot or riser interface.

The riser card has interface connectors that are adapted to removably receive peripheral interface cards that may be held in a card cage integrally attached to the riser card. The entire riser card, card cage and interface cards may be handled as a subassembly for fast and easy connection to the computer system motherboard.

In another aspect of the invention, no riser card is needed. All of the additional circuitry for either an addition in features or a system upgrade may reside on a card that may be removably connected to the motherboard interface connectors. One skilled in the art of digital logic and computer system control circuits could readily design appropriate control logic for various other aspects of the present invention using ASIC or other digital logic devices well known in the art.

The system and method of the present invention, therefore, is well adapted to carry out the objects and attain the ends and advantages mentioned, as well as others inherent therein. While a presently preferred embodiment of the invention has been given for purposes of disclosure, numerous changes in the details of construction, interconnection and arrangement of parts will readily suggest themselves to those skilled in the art, and which are encompassed within the spirit of the invention and the scope of the appended claims.

What is claimed is:

1. An apparatus, in a computer system, for expanding the functionality of the computer system, comprising:

a plurality of motherboard connectors on a computer system motherboard, said plurality of motherboard connectors connected to address, data, control, power and ground buses of the motherboard;

a riser card having a side edge portion removably insertable into said motherboard connectors so as to connect to the address, data, control, power and ground buses of the motherboard; and said riser card having a plurality of riser card connectors adapted for connection to a plurality of peripheral device interface cards and having application specific integrated circuits for translation of bus signals between the motherboard and interface cards.

* * * * *